United States Patent [19]

Awalt, Jr.

[11] Patent Number: 4,936,239
[45] Date of Patent: Jun. 26, 1990

[54] TOGGLE TENSIONER LOCK

[75] Inventor: Thomas Y. Awalt, Jr., Pensacola, Fla.

[73] Assignee: Deep Seven Co., Pensacola, Fla.

[21] Appl. No.: 279,774

[22] Filed: Dec. 5, 1988

Related U.S. Application Data

[63] Continuation-in-part of Ser. No. 159,910, Feb. 24, 1988, abandoned, which is a continuation-in-part of Ser. No. 914,983, Oct. 3, 1983, Pat. No. 4,750,445.

[51] Int. Cl.⁵ .............................................. B63B 21/08
[52] U.S. Cl. .................................... 114/199; 24/68 T
[58] Field of Search ............... 114/102, 108, 109, 199, 114/200; 24/68 T, 69 T, 69 TS, 69 WT, 70 CT, 70 TT, 494

[56] References Cited

U.S. PATENT DOCUMENTS

| 1,091,344 | 3/1914 | Jenks | 24/68 T |
| 2,998,272 | 8/1961 | Newcomer, Jr. et al. | 24/68 T |
| 4,280,432 | 7/1981 | Dessel | 114/109 |

FOREIGN PATENT DOCUMENTS 665917  2/1952  United Kingdom ............... 114/109

Primary Examiner—Joseph F. Peters, Jr.
Assistant Examiner—Jesûs Sotelo

[57] ABSTRACT

The invention is a device for tensioning and locking an attachable subject comprising in combination a toggle clamp and a snag proof quick release pin channel lock.

2 Claims, 1 Drawing Sheet

TOGGLE TENSIONER LOCK

This application is a continuation-in-part application of Ser. No. 07/159,910 filed Feb. 24, 1988, now abandoned, which was a continuation-in-part application of Ser. No. 914,983, filed Oct. 3, 1983, now U.S. Pat. No. 4,750,445.

BACKGROUND OF THE INVENTION

A. Field of the Invention

The invention relates to toggle clamps and locks therefore, and the use of said toggle clamps and locks for securing an anchor on the bow of a boat when the head of the shank of the anchor is resting on a roller, pin, channel or other apparatus and the flukes, plough or other digging portions are overlapping the roller, pin or channel.

B. The Prior Art

Toggle clamps are well known in the art of clamping objects against fixed position holders. The toggle clamp, by its very nature, provides a lock of sorts when it is in the retracted position. Most toggle clamps are subject to release by accidental tripping, vibration, or other external forces. It would be an advance in the art if toggle clamps were provided with safe locks, so that an object being held by a toggle clamp could be placed in the locked position with the quick and easy movement of a toggle clamp; and then, without releasing the tension therein provided, be subsequently safe locked with a fail safe pin.

Most intermediate sized boats in the 25-65 foot range have some accommodation for one or more anchors at the ready on the bow. An "anchor at the ready" as used herein is an anchor which can be released from the bow through a chute, over a roller or with other state-of-the-art apparatus.

Attached to most of these anchors is one or more shackles and a length of chain. While there are some elaborate systems for holding the anchor in place with winch gypsies, windlass gypsies and/or chain pawl locks, except for the chain pawl locks, most of these devices cannot be relied upon to prevent accidental release. Many less sophisticated systems require that the anchor be lashed with line or hooked with elastic (Bungie) cord on the bow to prevent accidental release. Lashings or elastic retainers are imperfect and susceptible to accidental release; and they are sometimes slow to make fast and release.

An object of this invention is to provide the easy clamping action of a toggle clamp in combination with a fail-safe locking means, in such a manner that once a clamp has been tensioned, there is no need to release the clamp prior to the fail-safe locking step.

Still a further object of this invention is to provide a means for quickly securing an anchor at the ready on the bow of a boat and then, without releasing the tensioning means, lock the tensioning means with a fail-safe snag proof secure lock.

Briefly, the objects of the invention are accomplished in a device comprising in combination an elongated channel having an essentially planar base, and two essentially planar sides, each of the sides having at least two circular orifices, each of the circular orifices on one of the sides paired with a similarly disposed orifice on the other of the sides, thereby providing a first pair and a second pair of orifices, and mounting means for the channel: a first pin mounted within the first pair of orifices and rotably holding a toggle arm having a mount end and a handle portion so disposed as to provide an open position with the handle portion extending out of the channel and a closed position with the handle portion essentially within the channel; an attachment arm rotatably mounted on the toggle arm handle; and a locking pin which is insertable within the second pair of orifices and over at least a portion of the handle in the closed position thereby to provide a locked status and which is removable from the path of the handle from the closed position to the open position to provide an unlocked status.

In the detailed description, reference will be made to the attached drawing in which FIG. 1 is a perspective of a preferred embodiment of this invention in which the handle is in the open position and the quick release pin is in the open standby position; and FIG. 2 is a perspective of a second preferred embodiment of this invention in which the handle is in the closed position and the pin is in the locked position.

DETAILED DESCRIPTION OF THE PREFERRED EMBODIMENT

Figure 1:
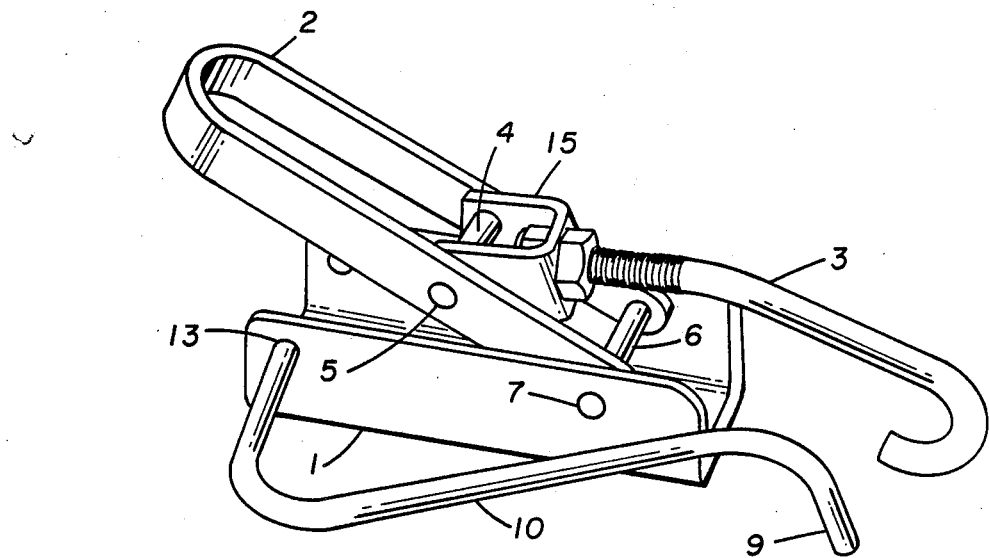
Figure 2:
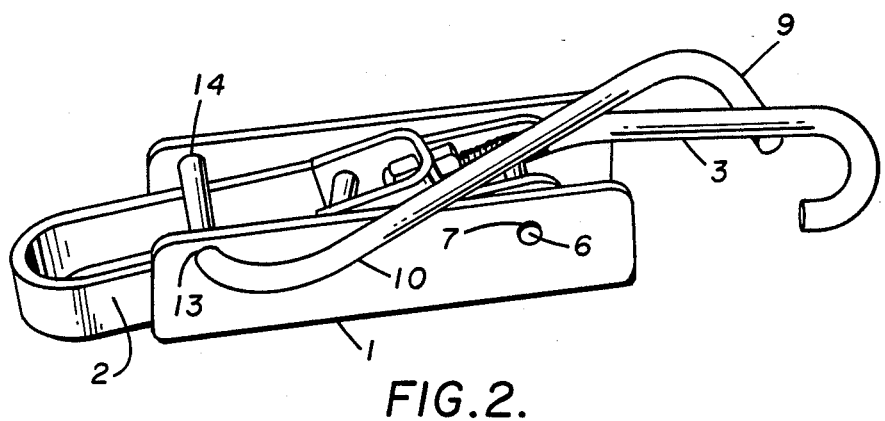

Referring now to FIG. 1, toggle clamp lock 1, comprising toggle handle 2 and toggle attachment arm 3, is bolted to yoke 15 which in turn is pivotally secured to toggle handle 2 by toggle attachment arm pin 4 through toggle arm orifice 5. Toggle handle 2 is hingedly attached to channel 8 by means of toggle handle pin 6 through channel orifice 7. When toggle clamp 1 is in the retracted position shown at FIG. 2, toggle handle 2 can be safe-locked with quick release locking pin 10. Quick release pin 10, which is inserted through orifice 13 in FIG. 1, can be inserted through quick release pin channel orifice 14 and is so shaped that in the locked position the forward end (9) reaches around attachment arm 3 and tortionally prevents its accidental release. Release pin 10 is a captive pin in the sense that an enlargement prevents its removal from orifice 13.

In operation, the retractable object such as a chain or shackle is engaged by toggle attachment arm 3, and toggle handle 2 is pulled back and downwardly into locking channel 8. Handle 2 can then be locked by inserting locking pin 10 through channel orifices 14 and over toggle handle 2.

I claim:

1. A device for tensioning and safe locking an attachable subject comprising in combination (1) An elongated channel having an essentially planar base and two essentially planar sides, each of said sides having at least two circular orifices, each of said circular orifices on one of said sides paired with a similarly disposed orifice on the other of said sides, thereby providing a first pair and a second pair of orifices defined by rotation of a radius on an axis, the axis of rotation of each pair of orifices being essentially perpendicular to the sides and essentially the same, and mounting means for the channel, the second pair of orifices having a first orifice on one side and a second orifice on the other side;

(2) a toggle arm having a mount end and a handle portion rotatably mounted on the first pair of orifices, and disposed to provide an open position with the handle portion extending out of the channel and generally perpendicular thereto, and a closed position with the handle portion essentially within the channel;

(3) an attachment arm rotatably mounted on the mount end of the toggle arm;

(4) a locking pin which is insertable through the first orifice of the second pair, over at least a portion of the handle in the closed position, and then through the second orifice of the second pair, thereby to provide a locked status, and which is removable from the path of the handle from the closed position to the open position, thereby to provide an unlocked status and wherein the second orifice of the second pair is of a larger diameter than the first orifice, and wherein the locking pin is partially removable and comprises an insertable portion and a handle portion, the insertable portion having an enlarged end, the enlarged end being of a diameter greater than the diameter of the first orifice but smaller than the diameter of the second orifice, the locking pin being disposed so that in the unlocked status the locking pin is partially removed and the enlarged end cannot be removed from the first orifice and is thereby captured in the side of the channel, and wherein the handle portion is so shaped that in the locked position it can be disposed to reach over and across the device and the handle end brought to torsionally bear against and over a part on the opposite side, thereby to hold the locking pin in a locked position.

2. The device of claim 1 wherein the part against which the handle end is brought to bear is the attachment arm.

* * * * *